E. J. VRAALSTAD.
MOLDING APPARATUS.
APPLICATION FILED MAY 14, 1908.

1,000,863.

Patented Aug. 15, 1911.
7 SHEETS—SHEET 6.

Witnesses
Inventor
Edward J. Vraalstad
By
Attorney

E. J. VRAALSTAD.
MOLDING APPARATUS.
APPLICATION FILED MAY 14, 1908.
1,000,863.
Patented Aug. 15, 1911.
7 SHEETS—SHEET 7.
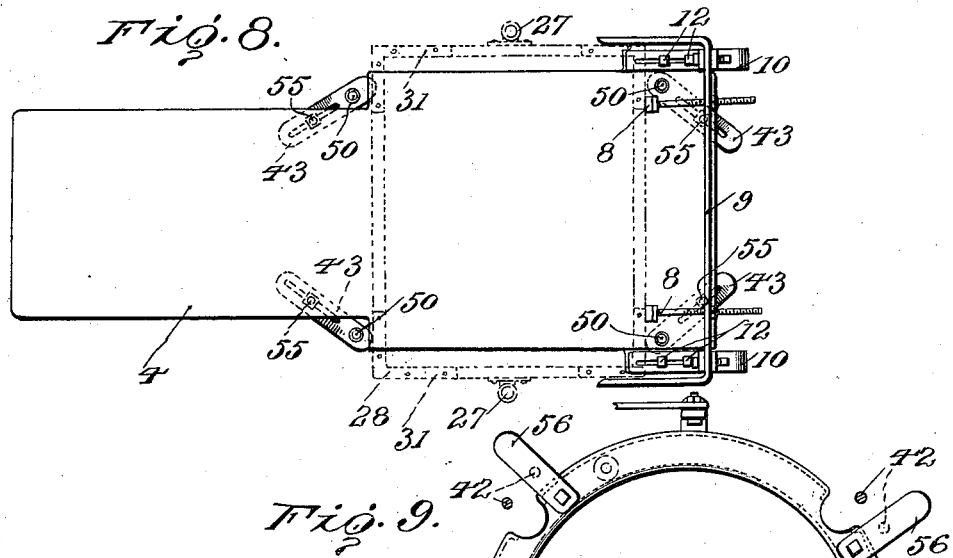
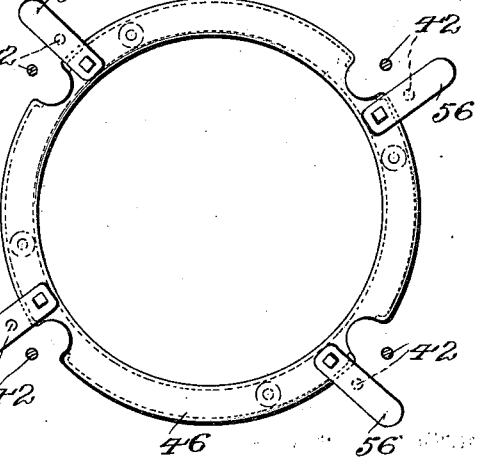
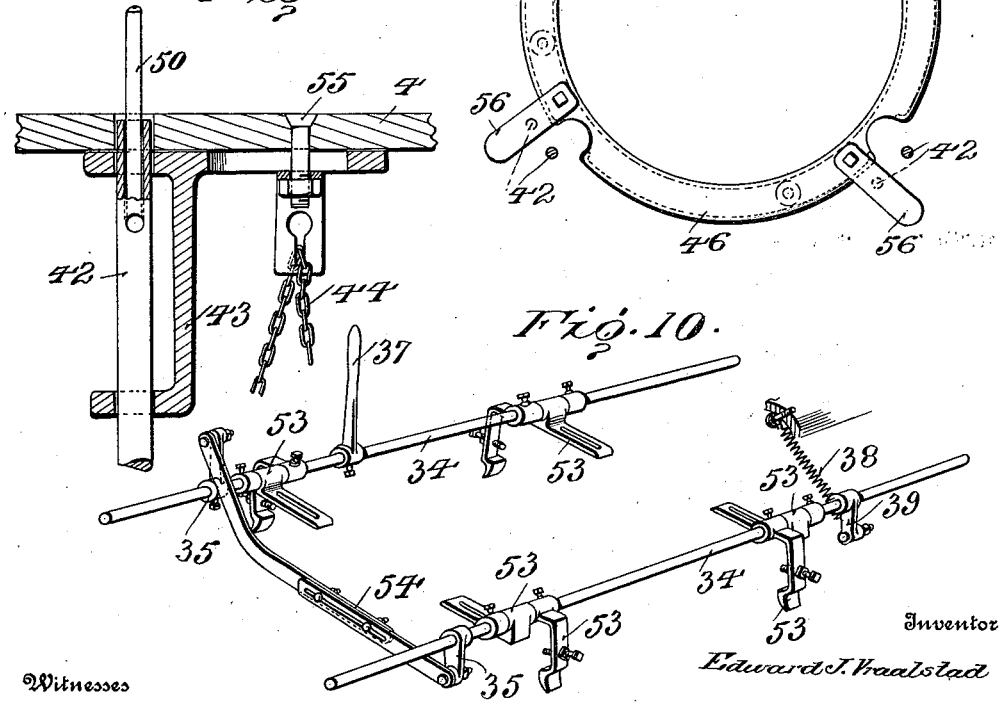
Witnesses
W. A. Williams
Inventor
Edward J. Vraalstad
By
Attorney

UNITED STATES PATENT OFFICE.

EDWARD J. VRAALSTAD, OF BUFFALO, NEW YORK.

MOLDING APPARATUS.

1,000,863.

Specification of Letters Patent. Patented Aug. 15, 1911.

Application filed May 14, 1908. Serial No. 432,913.

*To all whom it may concern:*

Be it known that I, EDWARD J. VRAALSTAD, of Buffalo, in the county of Erie and State of New York, have invented certain new and useful Improvements in Molding Apparatus; and I do hereby declare the following to be a full, clear, and exact description of the invention, such as will enable others skilled in the art to which it appertains to make and use the same.

The primary object of this invention is to provide an improved molding apparatus wherein the acts of compressing the sand; separating the parts of the mold; removing the pattern plate; and reclosing the mold may all be quickly and easily accomplished by means simple both in construction and operation.

A further object is to provide, in a molding apparatus, simple and efficient means for permitting the parts of the mold to be automatically separated to allow the pattern plate to be withdrawn, and to be again closed together and brought into position for removal from the apparatus without the necessity of handling any portion of the mold. And further objects are to provide simple and highly efficient means for automatically disengaging the pattern plate from the drag; and also for supporting the flask while at rest.

The invention will be hereinafter fully set forth and particularly pointed out in the claims.

Figure 1:
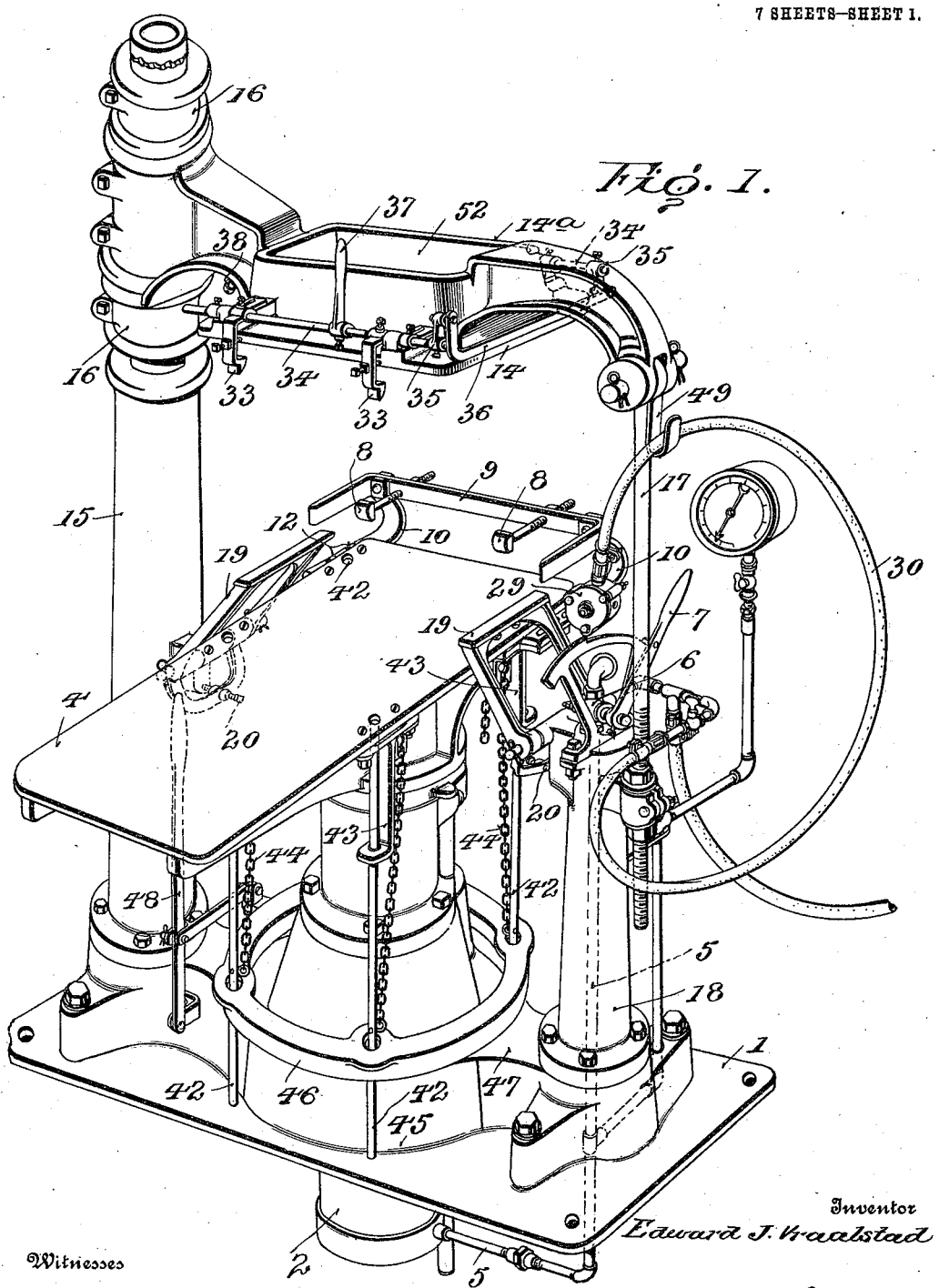
Figure 2:
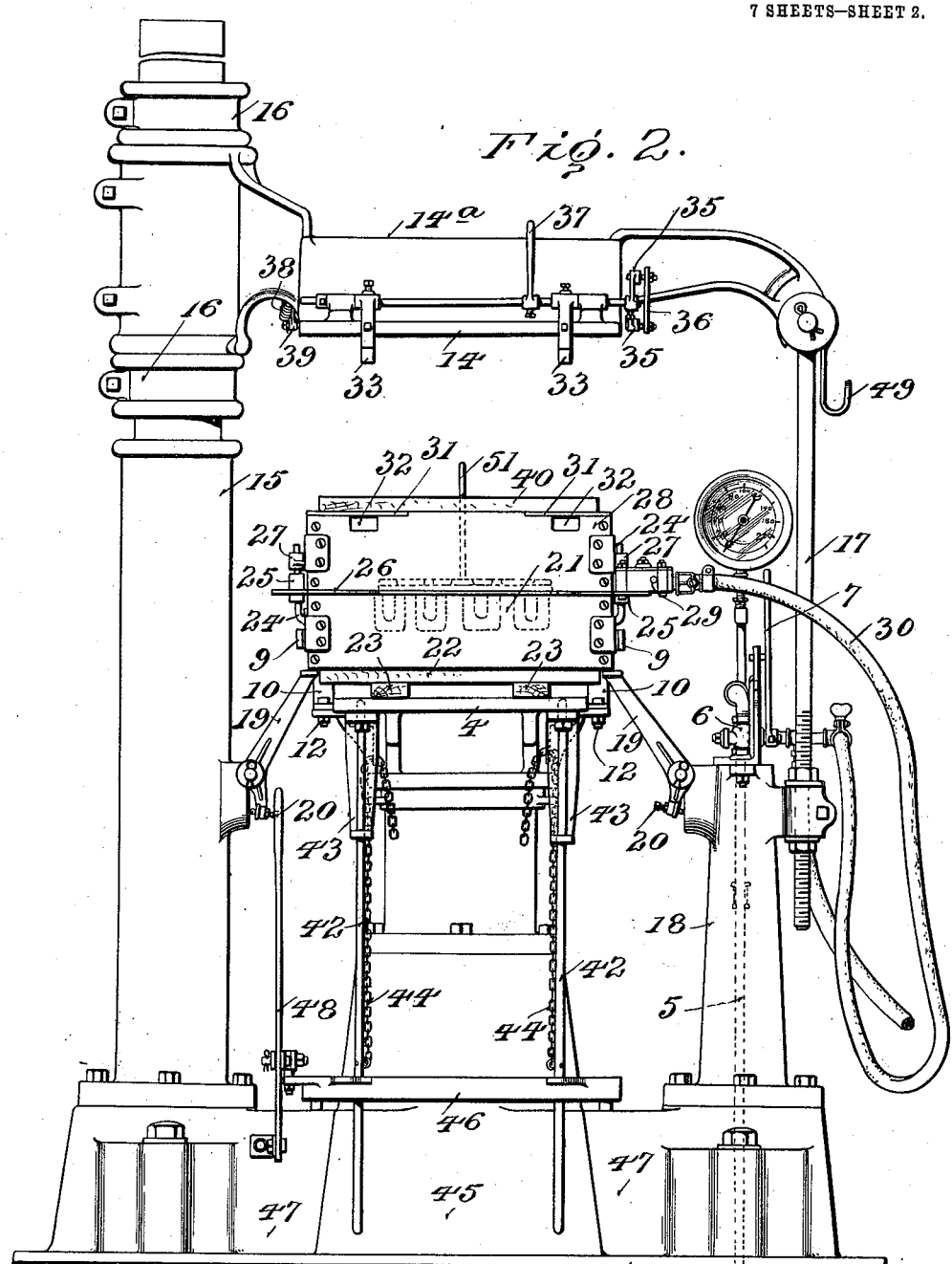
Figure 3:
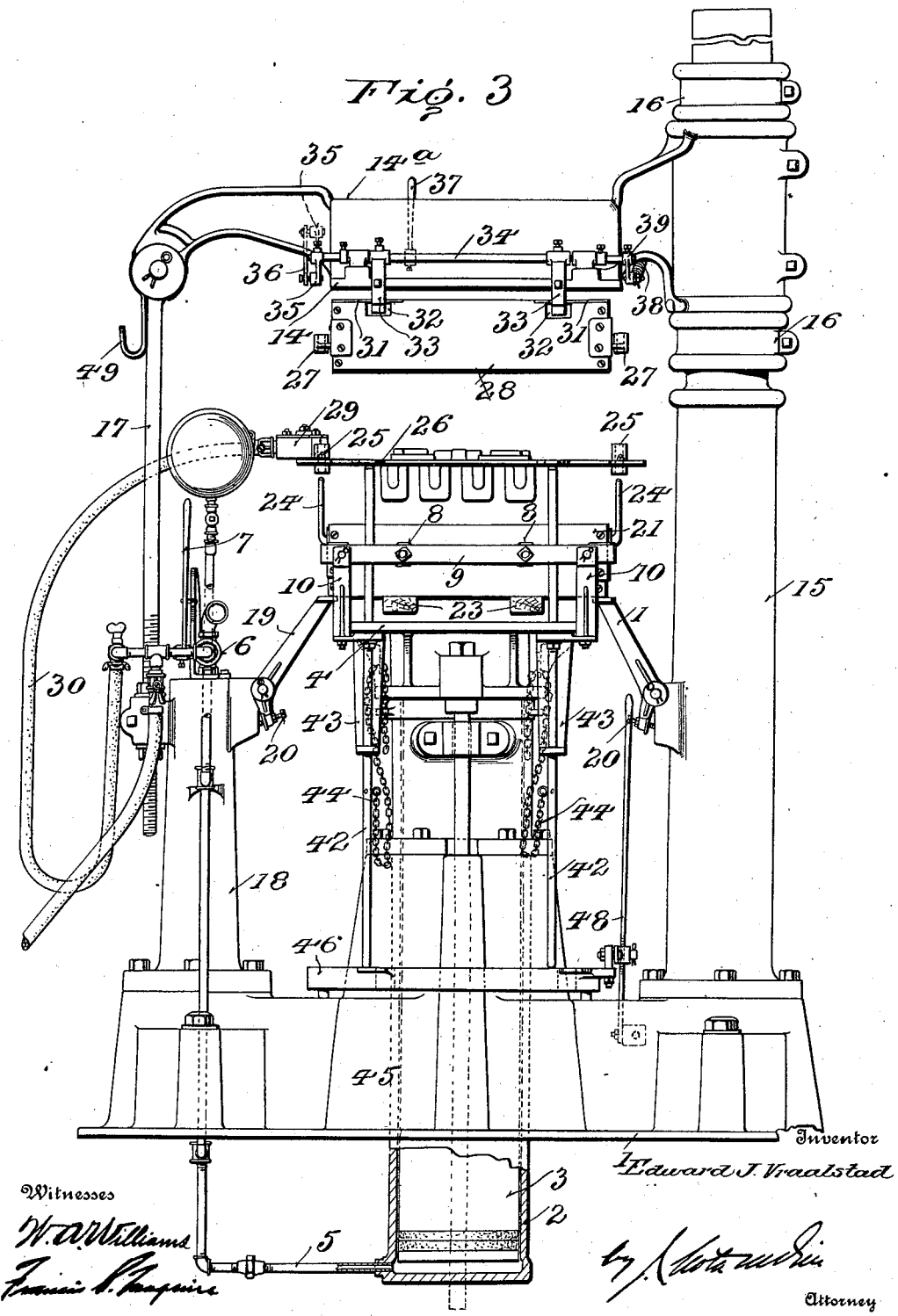
Figure 4:
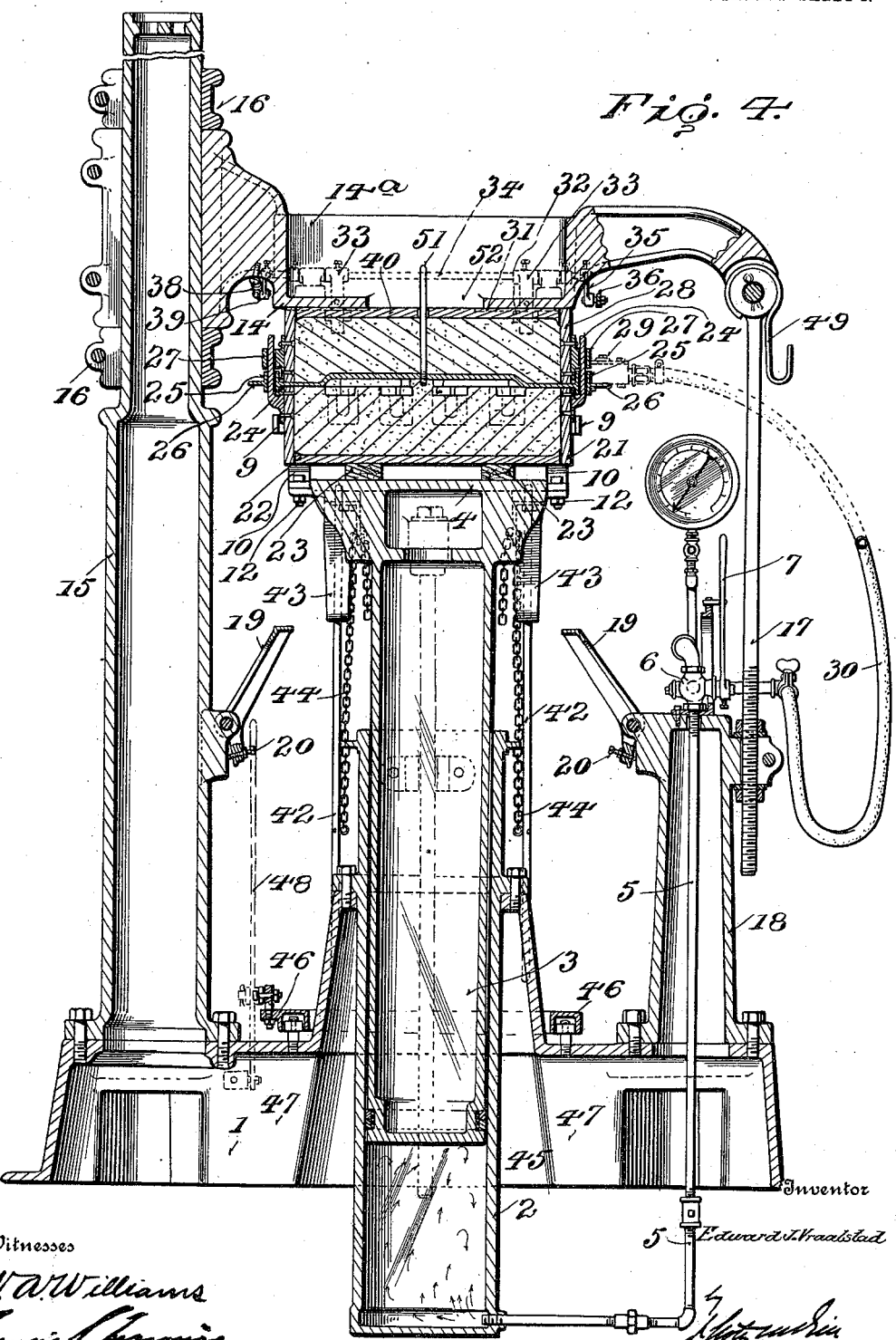
Figure 5:
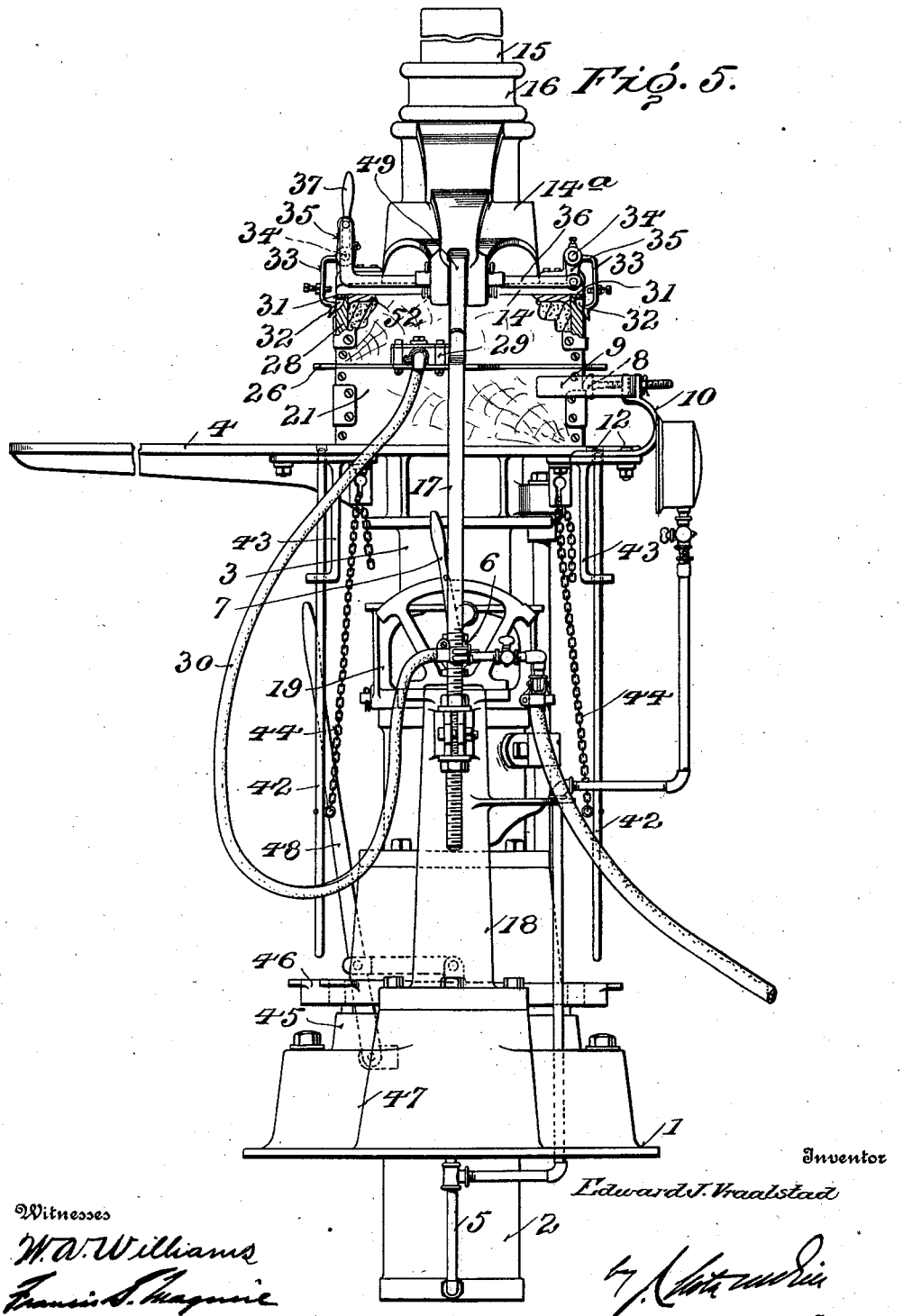
Figure 6:
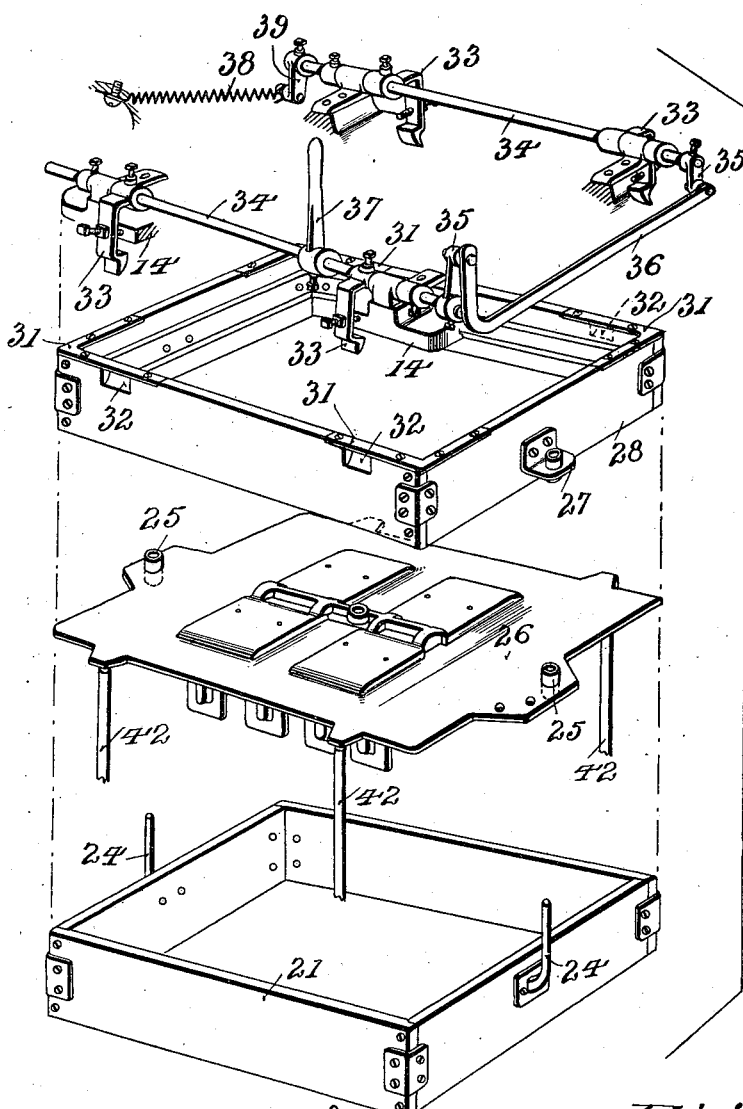
Figure 7:
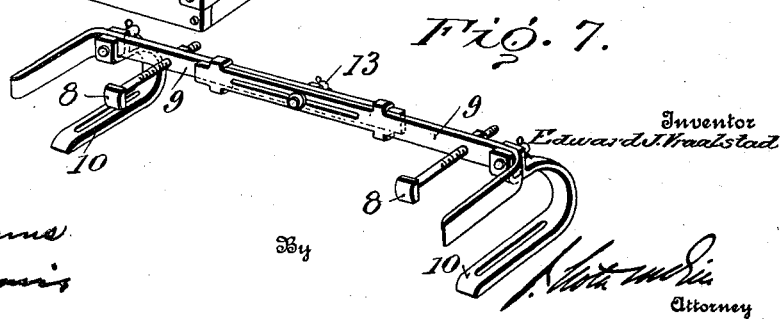

In the accompanying drawings, Figure 1 is a view in perspective. Fig. 2 is a front elevation. Fig. 3 is a rear elevation. Fig. 4 is a vertical sectional view through the center of the machine. Fig. 5 is a side elevation. Fig. 6 shows in perspective, the drag, the pattern plate, the cope and the device for retaining the cope elevated. Fig. 7 shows a slightly modified form of flask arrester and guide. Fig. 8 is a plan view, with parts omitted, showing slightly modified means for accommodating flasks of different sizes. Fig. 9 is a plan view of a modified form of stop for the pattern-removing rods. Fig. 10 shows a slight modification for the cope-retainer. Fig. 11 is a sectional detail.

Referring to the drawings, 1 designates a base; 2 an air-tight cylinder located centrally therein and extending above and below the base; 3 a piston fitted in said cylinder; and 4 a platen mounted on the upper end of the piston. Air is admitted to and exhausted from cylinder 2 through a pipe 5 leading from a suitable three-way valve 6 of known construction, and preferably controlled by a handle-lever 7. At one end platen 4 has stops 8 for enabling the operator to properly position a flask on the platen. These stops are adjustable; they are shown in the form of nutted bolts projecting from a bracket-bar 9 secured to the platen by curved arms 10, the lower slotted portions of which are held to extensions projecting laterally from the platen by screws or bolts 12. The ends of bracket-bar 9 are bent forward at right angles to the bar so as to aid in keeping the flask against the stops. As shown in Fig. 7 bracket-bar 9 may itself be adjusted lengthwise to accommodate flasks of different widths. For this purpose it is made in two telescoping parts or sections which are adjustably held together by a screw or bolt 13.

14 designates an upper stationary platen on the underside of an overhanging arm 14$^a$ adjustably held on a post 15 extending upwardly from base 1, the split-band securing said arm to the post being located between upper and lower adjustable stops 16. The free end of arm 14$^a$ is adjustably connected by a rod 17 to a second but shorter post 18 likewise secured to base 1. Such connection preventing any deflection of the stationary platen when the mold is under pressure. The upper platen is thus firmly held and yet it may be raised or lowered to accommodate flasks of different heights. The post 18 also forms the support for the air-controlling valve 6.

19, 19, designate supports for the drag whereby the latter will be mounted independently of the platen, and all danger of displacement thereof will be avoided. These supports are shown in the form of levers fulcrumed on posts 15 and 18 and having set screws 20 by adjusting which the levers may be properly positioned to accommodate drags of different sizes. The upper ends of these supports project toward each other but not to an extent to interfere with the up and down movements of the platen. The drag 21 of the flask is, as customary, of approximately rectangular formation open at both top and bottom, and when placed on the supports 19 its bottom is closed by a follower 22 having cleats 23 secured to its underside which bear directly on the platen.

The lower edges of opposite sides of the drag, when the platen is in its lowered position, rest directly upon the supports 19. (See Figs. 2 and 3.) By providing supports for the drag independent of the movable platen I avoid all danger of the drag sagging by reason of its weight not being overcome by the friction of the unpacked sand. These supports also permit me to increase the weight of the mold by filling the cope with sand and placing the top follower board in position without fear of jarring or disturbing the position of the drag. As customary, the drag is provided with the ordinary guide pins 24 for accommodating apertured portions 25 of pattern plate 26 and apertured portions 27 of cope 28 so as to hold the several parts in perfect alinement. I have shown the pattern plate 26 as having a vibrator 29 secured thereto, which vibrator may be operated by air pressure supplied through pipe 30 leading from valve 6.

The cope 28 has the same formation as the drag, but for the purpose of my invention a metallic band 31 is secured to the upper edges of the side walls of the cope, and in two of the opposite walls are formed pockets or cut-outs 32 the tops of which are formed by band 31. Into these pockets, when the flask is raised by the upward movement of the platen, enter the lower ends of hooked arms 33 which are carried by two shafts 34 journaled on the opposite sides of the upper platen 14. The shafts 34 at their ends have oppositely extended cranks 35 which are connected by a link 36 so that the operator by moving a handle 37, secured to one of the shafts 34, may turn the two shafts simultaneously as against the tension of a spring 38 secured to a crank arm 39 of one shaft 34. In this way hooked arms 33 may be removed from the pockets 32 to release the cope. When the flask is moved upward so as to force the cope-follower 40 against the upper platen the hooked ends of arms 33 will occupy a position slightly below the tops of pockets 32. After the desired pressure has been applied to the sand and the lower platen is lowered, by the exhaustion of air from cylinder 2, shortly after the cope starts downward the hooked ends of arms 33 will engage the tops of pockets 32 and hold the cope suspended while the drag and the pattern plate continue to move downward. This separation of the cope and drag is for the purpose of opening the flask to permit the removal of the pattern plate.

It will be noted that the cope is supported wholly by the plurality of arms on opposite sides of the stationary platen and that when so supported it is not in engagement with the platen. In other words, the cope is separated from the platen shortly after the mold has started to move away from the stationary platen. This enables the operator to determine the speed and control the machine at the time of separating the parts of the mold. It is essential that the vibrator should act on the pattern plate for a brief period to loosen the pattern plate from the sand in the cope at the very beginning of the separation of the two halves of the mold.

42 designates a series of vertically disposed rods which are fitted in openings in the lower platen and are guided by brackets 43 secured to the underside thereof, and these rods are also held by chains 44 which prevent the upper ends of the rods from being lowered out of engagement with the platen. When it is desired to effect the removal of a pattern plate from the drag, a ring 46 which encircles that portion of base 1 surrounding cylinder 2 is turned on its seat 47 by lever 48 into the paths of rods 42 so that imperforate portions of such ring will act as stops to prevent the lowering of such rods. These rods will, at their upper ends, be engaged by opposite projections of the pattern plate and thus arrest the latter while the drag moves downward. In this way the pattern plate is drawn or removed from the drag. The pattern plate being removed to one side, (and, if desired, suspended from a hook 49) pressure is again admitted to cylinder 2 and the lower platen is again raised to reclose the mold by bringing the drag into reëngagement with the cope. When this occurs the operator, by grasping handle 37, will disengage arms 32 from the cope to permit the latter to be lowered along with the drag. When ring 46 is turned so that cut-outs thereof will coincide with the pattern removing rods 42 the latter will be lowered out of the way by their own weight.

Since in some instances it is necessary to provide for increasing the clearance between the pattern plate and the drag, I provide pins 50 for fitting in central bores in the upper ends of rods 42 so as to add to the length of the latter. See Figs. 8 and 11. For all ordinary purposes the rods are of sufficient length without the use of these extensions. For the purpose of accommodating the sprue pin 51 carried by the pattern plate the upper platen 14 and overhanging arm 14ª are formed with an oblong opening 52.

To enable flasks of different sizes to be employed the bearings 53 for shafts 34 may be adjustably secured to the upper platen, and the link connecting the two shafts 34 may be formed in sections adjustably connected together, as shown at 54 in Fig. 10. For a similar reason the guide brackets for the pattern removing rods 42 may be pivotally connected to the underside of the lower platen as shown at 55 in Fig. 11. When the machine is thus constructed the ring which acts as a stop or support for these rods is equipped with peripheral projections 56, as shown in Fig. 9.

In practice, the charged drag is placed in position above the lower platen, and rests wholly upon supports 19, the follower 22 being placed on the platen in position to fit inside the drag. Assuming that the pattern plate and charged cope are in position, and that the flask is properly positioned against the stops 8, the operator admits air pressure to the piston cylinder causing the upward movement of the lower platen and the lifting of the drag from the supports 19, the friction of the sand being now sufficient to prevent the drag from sagging. The upward movement of the parts continues until they are raised into the position shown in Figs. 4 and 5, and the mold is rammed by the two followers 22 and 40 being forced by the two platens inwardly into the drag and cope, respectively. When the necessary pressure has been obtained, the air pressure is released, and the piston and its platen begin to move downward, carrying along the drag and the pattern plate, while the cope alone remains, being suspended by hooked arms 33, as shown in Fig. 3. The operator having previously turned ring 46 so as to position its imperforate portions beneath rods 42 the downward travel of the latter with the lower platen is arrested, and upon the pattern plate engaging the upper ends of these rods it also will be arrested and removed from the drag, while the latter continues to travel downwardly with the platen and piston. The pattern plate being then removed, pressure is again admitted to the piston cylinder and the drag is then again raised into engagement with the cope, which latter is slightly moved upward so as to relieve the hooked arms 33 of its weight, whereupon the operator by turning handle 37 will move said hooked arms so as to clear the cope. Pressure being again released from the piston cylinder the now reclosed flask will be lowered ready for removal from the apparatus.

I claim as my invention:—

1. A molding apparatus comprising a stationary platen, a movable platen, means for moving the latter toward and away from the stationary platen with a mold interposed between the two platens, arms mounted on opposite sides of the stationary platen for engaging and holding the cope of the mold after pressure has been applied to the latter and while the movable platen is being moved away from the stationary platen, and adjustable means connecting the arms so that all of them may be operated in unison.

2. A molding apparatus comprising a stationary platen, a movable platen, means for moving the latter toward and away from the stationary platen with a mold interposed between the two platens, arms mounted on opposite sides of the stationary platen for engaging and holding the cope of the mold after pressure has been applied to the latter and while the movable platen is being moved away from the stationary platen, rock shafts upon which said arms are mounted, means connecting such rock shafts, and an operating handle for the latter.

3. In a molding apparatus having an upper stationary platen and a lower movable platen, and in combination with a mold having pockets in opposite walls thereof, hooked arms depending from opposite sides of the stationary platen designed to enter and engage said pockets after pressure has been applied to the mold to arrest the movement of a part thereof, and means connecting the arms so that all of them may be operated in unison.

4. A molding apparatus comprising a stationary platen, a movable platen, means for moving the latter toward and away from the stationary platen with a mold interposed between the two platens, and means carried by the movable platen for engaging and removing the pattern plate from the mold during the movement of the latter away from the stationary platen after pressure has been applied to the mold.

5. A molding apparatus comprising an upper stationary platen, a lower movable platen, means for moving the latter toward and away from the stationary platen with a mold interposed between the two platens, a series of vertically-disposed rods carried by the movable platen, and means for arresting the movements of said rods when the movable platen is being moved away from the stationary platen, said rods engaging and removing the pattern plate from the mold.

6. A molding apparatus comprising an upper stationary platen, a movable platen, means for moving the latter toward and away from the stationary platen, with a mold interposed between the two platens, a series of vertically-disposed rods carried by the movable platen, a stop for arresting the downward movements of said rods during the downward movement of the platen for removing the pattern plate from the mold, and means for actuating said stop.

7. A molding apparatus comprising an upper stationary platen, a movable platen, means for moving the latter toward and away from the stationary platen, with a mold interposed between the two platens, a series of vertically-disposed rods carried by the movable platen, a ring located beneath the movable platen and having imperforate portions designed to be moved into the path of said rods for arresting the downward movements thereof, and means for actuating said ring.

8. The combination with a vertically movable platen, of brackets secured thereto, pattern-removing rods guided by said brackets, means loosely connecting the rods to the platen, and means for arresting the downward movements of said rods.

9. The combination with a vertically movable platen, of a series of pattern-removing rods carried by said platen, means for arresting said rods to effect the removal of a pattern plate from a mold carried by said platen, and removable extensions fitted in the ends of said rods.

10. A molding apparatus comprising an upper stationary platen, a lower movable platen, means for moving the latter toward and away from the stationary platen with a mold interposed between the two platens, means for automatically removing the cope from the drag while the movable platen is being moved away from the stationary platen, a series of vertically-movable rods carried by the movable platen, and means for arresting the movements of said rods while the movable platen is being moved downward, said rods engaging and effecting the separation of the pattern-plate from the drag.

11. In a molding apparatus having upper and lower platens, pivoted supports for the drag located adjacent to but independent of the lower platen on opposite sides thereof, and means for adjusting said supports for accommodating drags of different sizes.

12. In a molding apparatus having a movable platen, levers forming supports for the drag, supports for said levers independent of said platen, and means for adjusting the levers.

13. In a molding apparatus having a mold supporting platen, a bar extended along one end of said platen, and adjustable stops for the mold mounted in said bar.

14. In a molding apparatus having a mold supporting platen, an extensible bar secured to one end of said platen, adjustable stops mounted in said bar, and adjustable means for connecting said bar to the platen.

In testimony whereof, I have signed this specification in the presence of two subscribing witnesses.

EDWARD J. VRAALSTAD.

Witnesses:
C. M. GREINER,
H. P. SEIPP.

Copies of this patent may be obtained for five cents each, by addressing the "Commissioner of Patents, Washington, D. C."